(12) United States Patent
Ohashi et al.

(10) Patent No.: US 8,506,845 B2
(45) Date of Patent: Aug. 13, 2013

(54) SCINTILLATOR MATERIAL (75) Inventors: Yoshihiro Ohashi, Tokyo (JP); Nobuhiro Yasui, Yokohama (JP); Toru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/393,133

(22) PCT Filed: Aug. 31, 2010

(86) PCT No.: PCT/JP2010/005345
§ 371 (c)(1),
(2), (4) Date: Feb. 28, 2012

(87) PCT Pub. No.: WO2011/027537
PCT Pub. Date: Mar. 10, 2011

(65) Prior Publication Data
US 2012/0161074 A1    Jun. 28, 2012

(30) Foreign Application Priority Data

Sep. 2, 2009    (JP) .................................. 2009-202935
Feb. 23, 2010   (JP) .................................. 2010-037923

(51) Int. Cl.
*C09K 11/08* (2006.01)
*C09K 11/61* (2006.01)

(52) U.S. Cl.
USPC ................................................. 252/301.4 H

(58) Field of Classification Search
USPC ......... 252/301.4 H, 301.4 R, 301.17, 301.18; 250/370.11
See application file for complete search history.

(56) References Cited

U.S. PATENT DOCUMENTS

| 5,736,069 | A | 4/1998 | Willems et al. |
| 2005/0040340 | A1* | 2/2005 | Morikawa et al. ......... 250/484.4 |
| 2005/0089142 | A1 | 4/2005 | Marek |
| 2007/0108393 | A1* | 5/2007 | Shoji et al. ................ 250/483.1 |
| 2007/0120061 | A1* | 5/2007 | Kondo et al. ................ 250/367 |
| 2008/0014463 | A1* | 1/2008 | Varadarajan et al. ......... 428/690 |
| 2010/0034351 | A1* | 2/2010 | Yanagita et al. ............... 378/62 |
| 2011/0223323 | A1* | 9/2011 | Ohashi et al. ................ 427/157 |

FOREIGN PATENT DOCUMENTS

JP    2008-215951 A    9/2008

* cited by examiner

*Primary Examiner* — Emily Le
*Assistant Examiner* — Lynne Edmondson
(74) *Attorney, Agent, or Firm* — Canon U.S.A., Inc., IP Division (57) ABSTRACT

A scintillator material contains a compound represented by a general formula $[Cs_{1-z}Rb_z][I_{1-x-y}Br_xCl_y]$:In. In the general formula, x, y, and z satisfy any one of conditions (1), (2), and (3) below.
(1) When $0<x+y<1$ and $z=0$, at least one of Mathematical formula 1 and Mathematical formula 2 is satisfied.
(2) When $0<x+y<1$ and $0<z<1$, at least one of Mathematical formula 3 and $0<y<1$ is satisfied.
(3) When $x=y=0$, the relationship $0<z<1$ is satisfied.
The content of indium (In) is 0.00010 mole percent or more and 1.0 mole percent or less relative to $[Cs_{1-z}Rb_z][I_{1-x-y}Br_xCl_y]$.

[Math. 1]

$0<x\leq 0.7$    (Math. 1)

$0<y\leq 0.8$    (Math. 2)

$0<x\leq 0.8$    (Math. 3)

11 Claims, 6 Drawing Sheets

SCINTILLATOR MATERIAL

TECHNICAL FIELD

The present invention relates to a scintillator material. In particular, the present invention relates to a scintillator material that converts radiation into visible light.

BACKGROUND ART

A known image detector for radiation diagnosis is a radiation detector that detects radiated X-rays to acquire an X-ray image as digital signals. Such radiation detectors are broadly divided into direct X-ray detectors and indirect X-ray detectors. The indirect X-ray detectors are detectors in which X-rays are changed into visible light with a phosphor, and the visible light is converted into charge signals with a photoelectric conversion element such as an amorphous silicon (a-Si) photodiode or a charge coupled device (CCD) to acquire an image.

In the case where amorphous silicon (a-Si) is used as the photoelectric conversion element of such an indirect X-ray detector, since a-Si has sensitivity in a wavelength band of 450 to 650 nm, a phosphor that exhibits light emission in a wavelength band of about 450 to 650 nm is required.

Figure 5A:
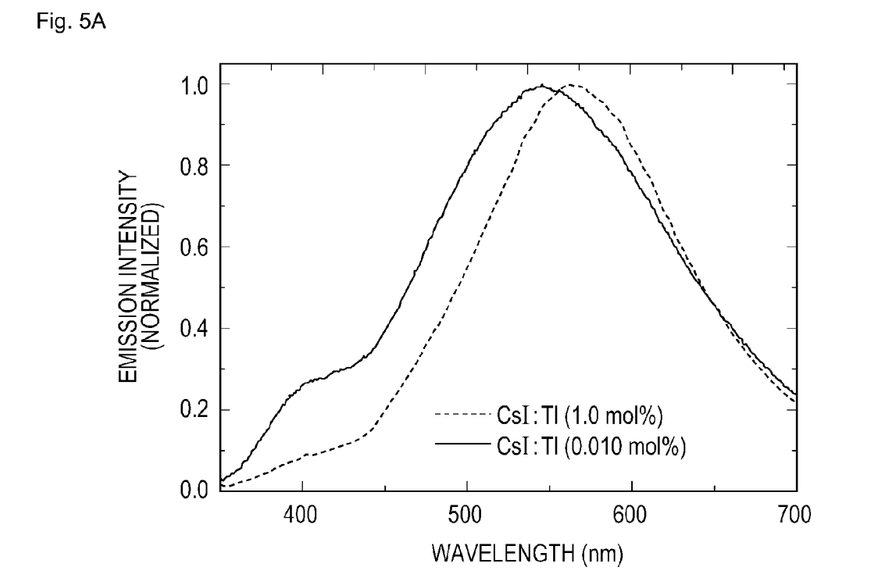
FIG. 5A is a graph showing a change in the emission spectrum between existing scintillator materials of CsI:Tl.

Hitherto, as described in PTL 1, cesium iodide:thallium (CsI:Tl) formed by adding thallium (Tl) to cesium iodide (CsI) has been used. The emission peak wavelength of CsI:Tl varies in the wavelength band of about 540 to 565 nm depending on the concentration of thallium (Tl) added. For example, FIG. 5A shows a change in the emission spectrum of a CsI:Tl scintillator material when the concentration of thallium (Tl) added was changed. When Tl is added to CsI in a low concentration (0.010 mole percent), the scintillator material exhibits an emission peak at about 540 nm. On the other hand, when Tl is added to CsI in a high concentration (1.0 mole percent), the scintillator material exhibits an emission peak at about 565 nm (refer to FIG. 5A). In this manner, the emission wavelength of CsI:Tl can be shifted to the long-wavelength side by adding Tl, which functions as a luminescence center, in a high concentration, whereby the emission wavelength can be made to coincide with the photosensitivity of a-Si.

CITATION LIST

Patent Literature

PTL 1: Japanese Patent Laid-Open No. 2008-215951

SUMMARY OF INVENTION

Technical Problem

Figure 5B:
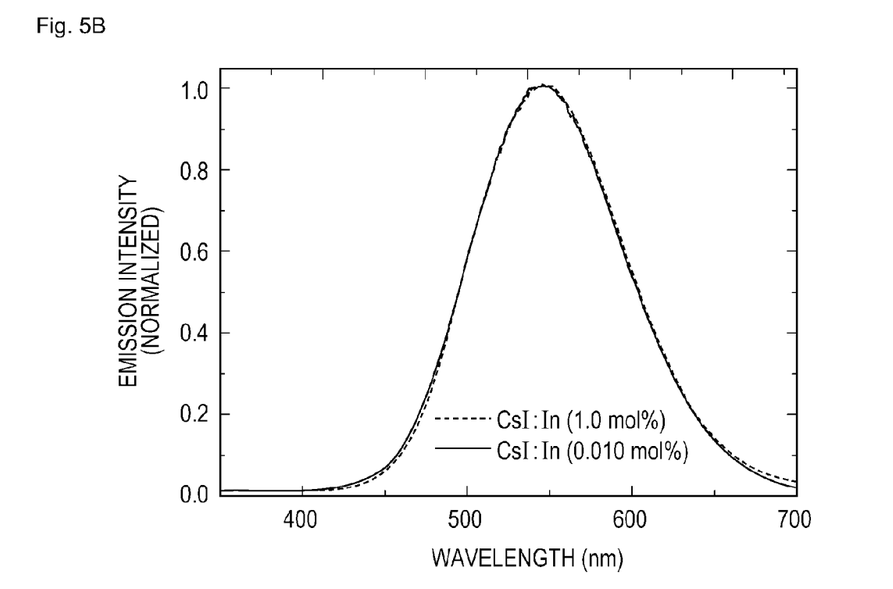

A scintillator material (CsI:In) formed by adding indium (In) as a luminescence center to cesium iodide (CsI) also functions as a scintillator similarly to CsI:Tl. However, as a result of studies on CsI:In-based materials conducted by the inventors of the present invention, the following became clear: In the cases where indium (In) was added to cesium iodide (CsI) in a low concentration (0.010 mol %) and a high concentration (1.0 mol %), the emission spectrum did not change, and these materials exhibited certain light emission at a wavelength of about 544 nm (refer to FIG. 5B). FIG. 5B shows the change in the emission spectrum between the CsI:In scintillator materials when the concentration of indium (In) added was changed.

That is, the inventors of the present invention found the following new problem: Unlike in the case of CsI:Tl, the emission wavelength of CsI:In cannot be shifted to the long-wavelength side by the technique in which the concentration of the luminescence center added is increased. Accordingly, the light emission cannot be adjusted to a wavelength range where detection sensitivity of a-Si is high.

The present invention provides a scintillator material containing a CsI:In-based material that exhibits light emission in a wavelength range where photosensitivity of a-Si is high.

Solution to Problem

The above problem can be solved by a configuration of the present invention described below. A scintillator material according to the present invention contains a compound represented by a general formula $[Cs_{1-z}Rb_z][I_{1-x-y}Br_xCl_y]:In$. In the general formula, x, y, and z satisfy any one of conditions (1), (2), and (3) below.

(1) When $0<x+y<1$ and $z=0$, at least one of Mathematical formula 1 and Mathematical formula 2 is satisfied.

$$0<x\leq 0.7 \qquad [\text{Math.1}]$$

$$0<y\leq 0.8 \qquad [\text{Math.2}]$$

(2) When $0<x+y<1$ and $0<z<1$, at least one of Mathematical formula 3 and $0<y<1$ is satisfied.

$$0<x\leq 0.8 \qquad [\text{Math.3}]$$

(3) When $x=y=0$, the relationship $0<z<1$ is satisfied.

The content of indium (In) is 0.00010 mole percent or more and 1.0 mole percent or less relative to $[Cs_{1-z}Rb_z][I_{1-x-y}Br_xCl_y]$.

Advantageous Effects of Invention

According to the present invention, a scintillator material containing a CsI:In-based scintillator material that exhibits light emission in a wavelength range where photosensitivity of a-Si is high can be provided.

BRIEF DESCRIPTION OF DRAWINGS

FIG. 5B is a graph showing a change in the emission spectrum between existing scintillator materials of CsI:In.

DESCRIPTION OF EMBODIMENTS

A feature of the present invention lies in that, in CsI:In, the emission wavelength is shifted to the long-wavelength side by replacing the I site of CsI, which is a parent material, with bromine (Br) or chlorine (Cl), which is a different halogen element, by replacing the Cs site of CsI with rubidium (Rb), which is a different alkali element, or by replacing both the I site and the Cs site with a different halogen element and a different alkali element, respectively, to obtain a scintillator material that exhibits light emission corresponding to a wavelength range where detection sensitivity of a-Si is high.

A description will now be separately made of a first embodiment in which only the I site of CsI is replaced with a different halogen element and a second embodiment that further involves a replacement of the Cs site of CsI with a different alkali element. The wavelengths described below are not absolute values, and the values of the wavelength may vary depending on a measuring device or a calibration method. Therefore, in the present invention, a relative difference in wavelength between compositions is important, and the present invention does not specify absolute values of the wavelengths.

First Embodiment

A feature of a first embodiment lies in that, in CsI:In, the emission wavelength is shifted to the long-wavelength side by replacing the I site of CsI, which is a parent material, with Br or Cl, which is a different halogen element, to obtain a scintillator material that exhibits light emission corresponding to a wavelength range where detection sensitivity of a-Si is high.

Scintillator materials of this embodiment will be described in detail below. A scintillator material of this embodiment contains a compound represented by a general formula $[Cs_{1-z}Rb_z][I_{1-x-y}Br_xCl_y]$:In, in which replacement with Rb is not performed, i.e., z=0, Specifically, the scintillator material of this embodiment contains a compound represented by a general formula $Cs[I_{1-x-y}Br_xCl_y]$:In. Here, the relationship 0<x+y<1 is satisfied, and at least one of Mathematical formula 4 and Mathematical formula 5 is satisfied.

$$0 < x \leq 0.7 \qquad \text{[Math.4]}$$

$$0 < y \leq 0.8 \qquad \text{[Math.5]}$$

Furthermore, the content of indium (In) is 0.00010 mole percent or more and 1.0 mole percent or less relative to $Cs[I_{1-x-y}Br_xCl_y]$.

In addition, the scintillator material of this embodiment contains a compound represented by a general formula $Cs[I_{1-x-y}Br_xCl_y]$:In, in which the relationship 0<x+y<1 is satisfied, at least one of Mathematical formula 6 and Mathematical formula 7 is satisfied, and the content of indium (In) is 0.00010 mole percent or more and 1.0 mole percent or less relative to $Cs[I_{1-x-y}Br_xCl_y]$.

$$0.15 \leq x \leq 0.4 \qquad \text{[Math.6]}$$

$$0.03 \leq y \leq 0.02 \qquad \text{[Math.7]}$$

In this embodiment, since the composition of the parent material of the scintillator material is configured to contain a certain amount of CsCl or CsBr in addition to CsI, the scintillator material exhibits light emission at the long-wavelength side relative to light emission of CsI:In. The detail thereof will be described below.

Figure 1:
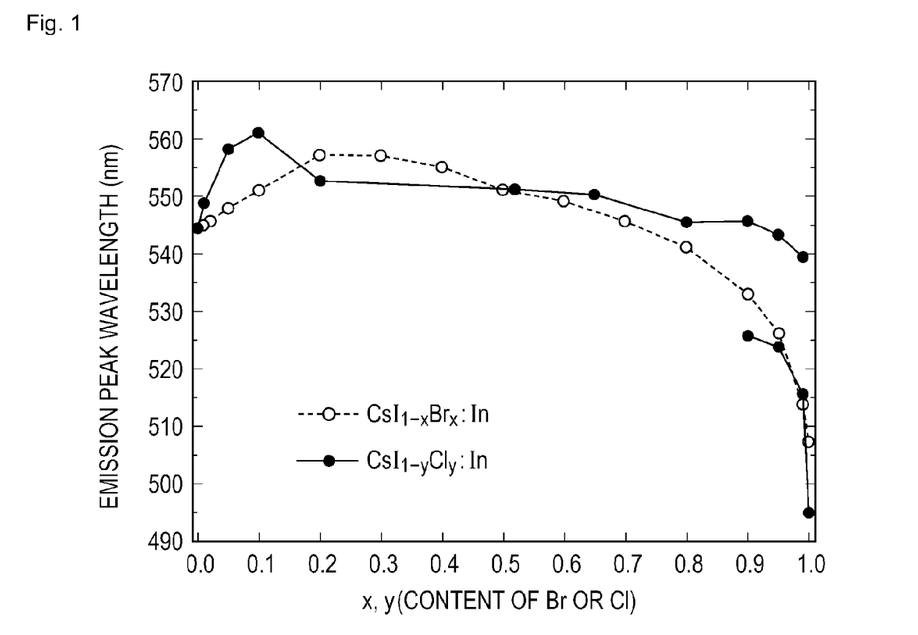
FIG. 1 is a graph showing the relationship between the amount of Cl or Br added and the emission peak wavelength in scintillator materials of Examples 1 and 2 of the present invention.

For simplicity, a description will now be made of a case where the parent material has a ternary composition represented by $CsI_{1-x}Br_x$:In in which y is 0, or $CsI_{1-y}Cl_y$:In in which x is 0. FIG. 1 is a graph showing the relationship between the amount of Cl or Br added and the emission peak wavelength in a scintillator material represented by $CsI_{1-x}Br_x$:In or $CsI_{1-y}Cl_y$:In. In $CsI_{1-x}Br_x$:In, when x=1, the composition is represented by CsBr:In, and this material emits blue light having an emission peak at 507 nm. In $CsI_{1-y}Cl_y$:In, when y=1, the composition is represented by CsCl:In, and this material emits blue light having an emission peak at 493 nm. In each of the case where x=0 and the case where y=0, the end composition is represented by CsI:In, and this material emits green light having an emission peak at 544 nm. Thus, in the end composition where x=0 or y=0, the material exhibits green light emission, and in the end composition in which x=1 or y=1, the material exhibits blue light emission.

However, as the results of studies conduced by the inventors of the present invention, it became clear that, as shown in FIG. 1, light emission in a composition range (0<x<1 or 0<y<1) between the end compositions does not monotonically change between the emission peaks at both the ends. More specifically, a composition range is present in which emission of yellow light having an emission peak at the longer-wavelength side with respect to 544 nm, which is the emission peak of CsI:In, occurs. Here, the composition range in which an emission peak is observed at the longer-wavelength side with respect to at least 544 nm, which is the emission peak of CsI:In, is in the ranges of Mathematical formula 8 and Mathematical formula 9.

$$0 < x \leq 0.7 \qquad \text{[Math.8]}$$

$$0 < y \leq 0.8 \qquad \text{[Math.9]}$$

Furthermore, a composition range in which the emission peak wavelength is shifted to the longer-wavelength side with respect to the emission peak wavelength of CsI:In by 10 nm or more is in the ranges of Mathematical formula 10 and Mathematical formula 11.

$$0.15 \leq x \leq 0.4 \qquad \text{[Math.10]}$$

$$0.03 \leq y \leq 0.2 \qquad \text{[Math.11]}$$

Ternary compositions in which either x or y is 0 have been described above. However, a similar wavelength shift occurs in a quaternary composition represented by $CsI_{1-x-y}Br_xCl_y$ in which neither x nor y is 0. In this manner, when the composition of the parent material is configured to contain, in addition to CsI, at least one different cesium halide (such as CsBr and/or CsCl), the emission wavelength can be shifted to the longer-wavelength side with respect to the emission wavelength of CsI:In to adjust to a wavelength range where detection sensitivity of a-Si is high.

Furthermore, by shifting the light emission to the long-wavelength side, optical absorption by members constituting a device can be prevented, so that a large amount of light can be made to reach an amorphous silicon (a-Si) sensor. Specifically, polymer materials are used as, for example, a substrate and a sealing member that constitute a device, and these members absorb some of light components having short wavelengths of about 450 nm or less. Therefore, in the emission of light from a scintillator, some of light components of about 450 nm are absorbed and do not reach the a-Si sensor.

To solve this problem, as in the present invention, a wavelength at which optical absorption occurs is avoided by shifting the light emission to the long-wavelength side, and thus a large amount of light can be made to reach the a-Si sensor as compared with the case of CsI:In.

As described above, by using a scintillator material of the present invention which is represented by a general formula $CsI_{1-x-y}Br_xCl_y$:In, $CsI_{1-x}Br_x$:In, or $CsI_{1-y}Cl_y$:In in which x and y satisfy the relationship $0<x+y<1$, and x and y satisfy at least one of Mathematical formula 12 and Mathematical formula 13, the output can be improved compared with the case of CsI:In.

$$0<x\leq0.7 \quad \text{[Math.12]}$$

$$0<y\leq0.8 \quad \text{[Math.13]}$$

The content of indium (In) contained in the scintillator material of the present invention, the scintillator material containing a compound represented by the general formula $CsI_{1-x-y}Br_xCl_y$:In, is 0.00010 mole percent or more and 1.0 mole percent or less relative to $CsI_{1-x-y}Br_xCl_y$.

The content of indium (In) contained in the scintillator material of the present invention, the scintillator material containing a compound represented by the general formula $CsI_{1-x}Br_x$:In, is 0.00010 mole percent or more and 1.0 mole percent or less relative to $CsI_{1-x}Br_x$.

Furthermore, the content of indium (In) contained in the scintillator material of the present invention, the scintillator material containing a compound represented by the general formula $CsI_{1-y}Cl_y$:In, is 0.00010 mole percent or more and 1.0 mole percent or less relative to $CsI_{1-y}Cl_y$.

The scintillator material of this embodiment can be produced by adding a certain amount of CsCl and/or CsBr to CsI, further adding a certain amount of indium iodide (InI), mixing these compounds, and heating the resulting sample at 620 degrees Celsius or higher.

Second Embodiment

A feature of a second embodiment lies in that, in CsI:In, the emission wavelength is shifted to the long-wavelength side by replacing the Cs site of CsI, which is a parent material, with Rb, which is a different alkali element, to obtain a scintillator material that exhibits light emission corresponding to a wavelength range where detection sensitivity of a-Si is high.

That is, the second embodiment differs from the first embodiment in that the Cs site of CsI is replaced with Rb, which is a different alkali element, in the second embodiment whereas only the I site of CsI is replaced with Br or Cl, which is a different halogen element, in the first embodiment. Furthermore, the second embodiment differs from the first embodiment in that the I site and the Cs site are replaced with different halogen element and alkali element, respectively.

Scintillator materials of this embodiment will be described in detail below. A scintillator material of this embodiment contains a compound represented by a general formula $[Cs_{1-z}Rb_z][I_{1-x-y}Br_xCl_y]$:In. In the general formula, x, y, and z satisfy any one of conditions (1), (2), and (3) below.

(1) When $0<x+y<1$ and $z=0$, at least one of Mathematical formula 14 and Mathematical formula 15 is satisfied.

$$0<x\leq0.7 \quad \text{[Math.14]}$$

$$0<y\leq0.8 \quad \text{[Math.15]}$$

(2) When $0<x+y<1$ and $0<z<1$, at least one of Mathematical formula 16 and $0<y<1$ is satisfied.

$$0<x\leq0.8 \quad \text{[Math.16]}$$

(3) When $x=y=0$, the relationship $0<z<1$ is satisfied.

The content of indium (In) is 0.00010 mole percent or more and 1.0 mole percent or less relative to $[Cs_{1-z}Rb_z][I_{1-x-y}Br_xCl_y]$.

In a scintillator material according to a preferred embodiment of the scintillator material containing a compound represented by the above general formula $[Cs_{1-z}Rb_z][I_{1-x-y}Br_xCl_y]$:In, x, y, and z satisfy any one of conditions (1), (2), and (3) below.

(1) When $0<x+y<1$ and $z=0$, at least one of Mathematical formula 17 and Mathematical formula 18 is satisfied.

$$0.15\leq x\leq0.4 \quad \text{[Math.17]}$$

$$0.03\leq y\leq0.2 \quad \text{[Math.18]}$$

(2) When $0<x+y<1$ and $0<z<1$, at least one of Mathematical formula 19 and Mathematical formula 20 is satisfied.

$$0.05<x\leq0.6 \quad \text{[Math.19]}$$

$$0.25\leq y\leq0.33 \quad \text{[Math.20]}$$

(3) When $x=y=0$, Mathematical formula 21 is satisfied.

$$0.07\leq z\leq0.5 \quad \text{[Math.21]}$$

Here, the content of indium (In) is 0.00010 mole percent or more and 1.0 mole percent or less relative to $[Cs_{1-z}Rb_z][I_{1-x-y}Br_xCl_y]$.

In this embodiment, since the composition of the parent material of the scintillator material is configured to contain a certain amount of RbI, RbBr, or RbCl in addition to CsI, the scintillator material exhibits light emission at the long-wavelength side relative to light emission of CsI:In. The detail thereof will be described below.

Figure 6:
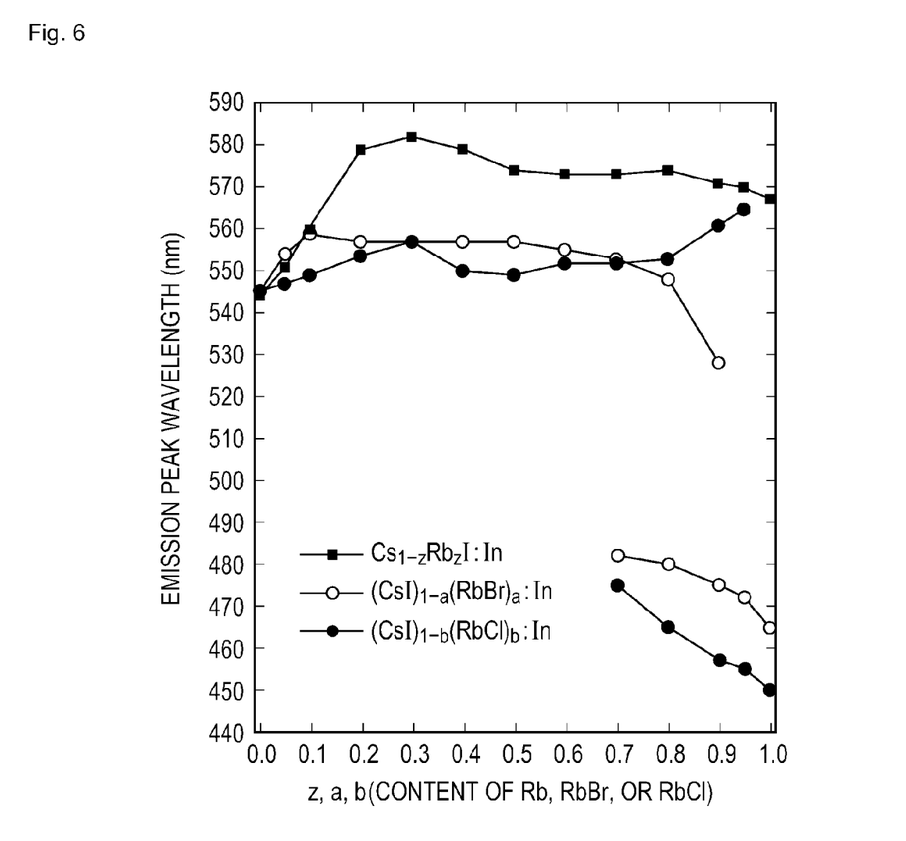
FIG. 6 is a graph showing the relationship between the amount of Rb, RbBr, or RbCl added and the emission peak wavelength in scintillator materials of Examples 4, 5, and 6 of the present invention.

FIG. 6 is a graph showing the relationship between the amount of Rb, RbBr, or RbCl added and the emission peak wavelength in a scintillator material represented by $Cs_{1-z}Rb_zI$:In, $(CsI)_{1-a}(RbBr)_a$:In, or $(CsI)_{1-b}(RbCl)_b$:In. The case where only an alkali element is replaced and the case where both a halogen element and an alkali element are replaced will be separately described below.

First, a description will be made of a scintillator material in which only an alkali element is replaced, i.e., which is represented by $Cs_{1-z}Rb_zI$:In in which $x=y=0$. In $Cs_{1-z}Rb_zI$:In, when $z=1$, the composition is represented by RbI:In, and this material emits yellow light having an emission peak at 567 nm. In $Cs_{1-z}Rb_zI$:In, when $z=0$, the composition is represented by CsI:In, and this material emits green light having an emission peak at 544 nm. Thus, in the end composition in which $z=0$, green light emission occurs, and in the end composition in which $z=1$, yellow light emission occurs. However, as the results of studies conduced by the inventors of the present invention, it became clear that, as shown in FIG. 6, light emission in a composition range ($0<z<1$) between the end compositions does not monotonically change between the emission peaks at both the ends. More specifically, a composition range is present in which emission of orange light having an emission peak at the longer-wavelength side with respect to 544 nm, which is the emission peak of CsI:In, occurs. Here, the composition range in which an emission peak is observed at the longer-wavelength side with respect to at least 544 nm, which is the emission peak of CsI:In, is in the range of $0<z<1$. Furthermore, a composition range in which the emission peak wavelength is shifted to the longer-wavelength side with respect to the emission peak wavelength of CsI:In by 10 nm or more is in the range of Mathematical formula 22.

$$0.07 \leq z \leq 1 \quad [\text{Math.22}]$$

The composition that achieves the maximum emission wavelength shift is $Cs_{0.7}Rb_{0.3}I$, and the emission wavelength thereof is 584 nm. Here, the replacement of Cs (atomic number 55) with Rb (atomic number 37) decreases the stopping power for X-rays, and thus the amount of replacement with Rb is preferably a half or less of the amount of Cs. Accordingly, considering that the decrease in the stopping power for X-rays can be suppressed in a range of Mathematical formula 23, the composition range that achieves a wavelength shift of 10 nm or more is preferably determined in the range of Mathematical formula 24.

$$z \leq 0.5 \quad [\text{Math.23}]$$

$$0.07 \leq z \leq 0.5 \quad [\text{Math.24}]$$

As described above, when $x=y=0$ in the general formula $[Cs_{1-z}Rb_z][I_{1-x-y}Br_xCl_y]$:In of the present invention, by using the scintillator material which is represented by a general formula $Cs_{1-z}Rb_zI$:In, in which the relationship $0<z<1$ is satisfied, the output can be improved compared with the case of CsI:In. The content of indium (In) is 0.00010 mole percent or more and 1.0 mole percent or less relative to $Cs_{1-z}Rb_zI$.

Next, a description will be made of a case where both an alkali element and a halogen element are replaced. Here, for simplicity, scintillator materials in which the amount of replacement of the alkali element is the same as the amount replacement of the halogen element, i.e., scintillator materials represented by $(CsI)_{1-a}(RbBr)_a$:In and $(CsI)_{1-b}(RbCl)_b$:In will be discussed.

First, a description will be made of a scintillator material that contains a compound represented by a general formula $(CsI)_{1-a}(RbBr)_a$:In, in which a satisfies Mathematical formula 25, and the content of indium (In) is 0.00010 mole percent or more and 1.0 mole percent or less relative to $(CsI)_{1-a}(RbBr)_a$.

$$0<a \leq 0.8 \quad [\text{Math.25}]$$

In the above-mentioned $(CsI)_{1-a}(RbBr)_a$:In in which Cs is replaced with Rb and I is replaced with Br, when $a=1$, the composition is represented by RbBr:In, and this material emits sky blue light having an emission peak at 465 nm. When $a=0$, the composition is represented by CsI:In, and this material emits green light having an emission peak at 544 nm. Thus, in the end composition in which $a=0$, green light emission occurs, and in the end composition in which $a=1$, sky blue light emission occurs. However, as the results of studies conduced by the inventors of the present invention, it became clear that, as shown in FIG. 6, light emission in a composition range ($0<a<1$) between the end compositions does not monotonically change between the emission peaks at both the ends. More specifically, a composition range is present in which emission of yellow light having an emission peak at the longer-wavelength side with respect to 544 nm, which is the emission peak of CsI:In, occurs. Here, the composition range in which an emission peak is observed at the longer-wavelength side with respect to at least 544 nm, which is the emission peak of CsI:In, is in the range of Mathematical formula 26.

$$0<a \leq 0.8 \quad [\text{Math.26}]$$

Furthermore, a composition range in which the emission peak wavelength is shifted to the longer-wavelength side with respect to the emission peak wavelength of CsI:In by 10 nm or more is in the range of Mathematical formula 27.

$$0.05 \leq a \leq 0.6 \quad [\text{Math.27}]$$

The composition that achieves the maximum emission wavelength shift is $(CsI)_{0.9}(RbBr)_{0.1}$, and the emission wavelength thereof is 559 nm.

Next, a description will be made of a scintillator material that contains a compound represented by a general formula $(CsI)_{1-b}(RbCl)_b$:In, in which b satisfies $0<b<1$, and the content of indium (In) is 0.00010 mole percent or more and 1.0 mole percent or less relative to $(CsI)_{1-b}(RbCl)_b$.

In the above-mentioned $(CsI)_{1-b}(RbCl)_b$:In in which Cs is replaced with Rb and I is replaced with Cl, when $b=1$, the composition is represented by RbCl:In, and this material emits blue light having an emission peak at 450 nm. When $b=0$, the composition is represented by CsI:In, and this material emits green light having an emission peak at 544 nm. Thus, in the end composition in which $b=0$, green light emission occurs, and in the end composition in which $b=1$, blue light emission occurs. However, as the results of studies conduced by the inventors of the present invention, it became clear that, as shown in FIG. 6, light emission in a composition range ($0<b<1$) between the end compositions does not monotonically change between the emission peaks at both the ends. More specifically, a composition range is present in which emission of yellow light having an emission peak at the longer-wavelength side with respect to 544 nm, which is the emission peak of CsI:In, occurs. In this composition range between the end compositions, originally, the emission peak of CsI:In and the emission peak of RbCl:In continuously shift. However, these peaks do not intersect in the intermediate composition range of $0<b<1$ and are present as separate emission peaks. Therefore, in a composition range approximately represented by Mathematical formula 28, the emission peak is separated into two peaks.

$$0.7 \leq b \leq 0.95 \quad [\text{Math.28}]$$

Here, the composition range in which an emission peak is observed at the longer-wavelength side with respect to at least 544 nm, which is the emission peak of CsI:In, is in the range of $0<b<1$. Furthermore, in a range of $b<0.7$, in which emission of light having a short wavelength caused by the separation of the emission peak is not observed, a composition range in which the emission peak wavelength is shifted to the longer-wavelength side with respect to the emission peak wavelength of CsI:In by 10 nm or more is in the range of Mathematical formula 29.

$$0.25 \leq b \leq 0.33 \quad [\text{Math.29}]$$

The composition that achieves the maximum emission wavelength shift is $(CsI)_{0.7}(RbCl)_{0.3}$, and the emission wavelength thereof is 556 nm.

As described above, by using a scintillator material of the present invention which is represented by a general formula $[Cs_{1-z}Rb_z][I_{1-x-y}Br_xCl_y]$:In, wherein when $0<x+y<1$ and $0<z<1$, at least one of Mathematical formula 30 and $0<y<1$ is satisfied, the output can be improved compared with the case of CsI:In.

$$0<x \leq 0.8 \quad [\text{Math.30}]$$

The content of indium (In) is 0.00010 mole percent or more and 1.0 mole percent or less relative to $[Cs_{1-z}Rb_z][I_{1-x-y}Br_xCl_y]$.

The scintillator material of this embodiment can be produced by adding a certain amount of RbI and/or RbBr and/or RbCl to CsI, further adding a certain amount of InI, mixing these compounds, and heating the resulting sample at 620 degrees Celsius or higher.

EXAMPLES

The present invention will now be described by way of Examples, but the present invention is not limited to Examples below.

Example 1

This Example corresponds to the first embodiment. In this Example, a scintillator material represented by a general formula $CsI_{1-x}Br_x$:In, which is a composition where y=0 in a general formula $CsI_{1-x-y}Br_xCl_y$:In, was prepared. First, cesium iodide (CsI) and cesium bromide (CsBr) were weighed so that, in the general formula $CsI_{1-x}Br_x$, compositions satisfying x=1, 0.99, 0.95, 0.90, 0.80, 0.70, 0.60, 0.50, 0.40, 0.30, 0.20, 0.10, 0.050, 0.020, 0.010, and 0 were obtained. Next, InI was added to each of the samples so that the indium (In) concentration was 0.01 mole percent relative to $CsI_{1-x}Br_x$, and mixed. The resulting samples were melted at 650 degrees Celsius for five minutes to prepare 16 samples, the compositions of which continuously changed from one to another.

Emission spectra of the respective prepared samples were measured. The results of the emission peak wavelength are summarized in FIG. 1. When x=0, the end composition is represented by CsI:In, and this material exhibited an emission peak at 544 nm. When x=1, the end composition is represented by CsBr:In, and this material exhibited an emission peak at 507 nm. The emission peak in this composition range between these end compositions did not monotonically change between CsI:In and CsBr:In, but a composition range in which an emission peak was observed at the longer-wavelength side with respect to 544 nm, which was the emission peak of CsI:In, was present. Here, the composition range in which an emission peak was observed at the longer-wavelength side with respect to at least 544 nm, which was the emission peak of CsI:In, was in the range of Mathematical formula 31.

$$0 < x \leq 0.07 \qquad [\text{Math.31}]$$

Furthermore, a composition range in which the emission peak wavelength was shifted to the longer-wavelength side with respect to the emission peak wavelength of CsI:In by 10 nm or more was in the range of Mathematical formula 32.

$$0.15 \leq x \leq 0.4 \qquad [\text{Math.32}]$$

Figure 2:
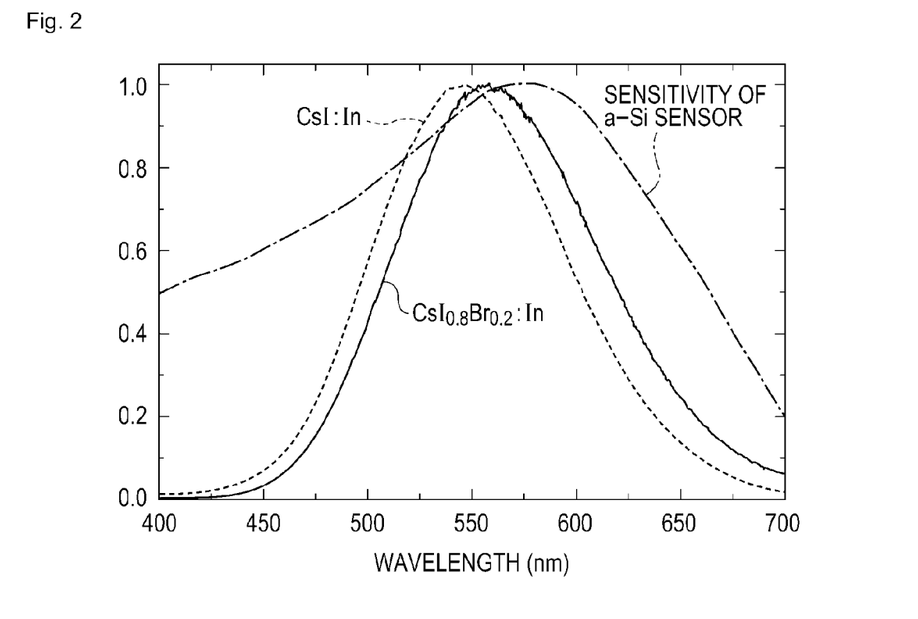
FIG. 2 is a graph showing the relationship between the emission spectrum of a scintillator material of Example 1 of the present invention and sensor detection sensitivity.

The composition in which the amount of shift of the emission peak became maximum was the case where x=0.2, and this composition is represented by $CsI_{0.8}Br_{0.2}$:In. The emission spectrum of this composition in which x=0.2 is shown in FIG. 2. For comparison, the emission spectrum of CsI:In is also shown in FIG. 2. A sensitivity curve of amorphous silicon (a-Si) is also shown in FIG. 2. An a-Si sensor also has sensitivity in a wavelength range of 450 nm or less, however, in actual devices, some of light components of about 450 nm or less are absorbed by polymer members. Therefore, even when a scintillator exhibits light emission at about 450 nm, the light neither reaches the a-Si sensor and nor contributes to the output. The composition in which x=0.2 had an emission peak at 557 nm, which was shifted to the longer-wavelength side by about 13 nm with respect to the emission peak of CsI:In. In this manner, by using $CsI_{0.8}Br_{0.2}$:In, which is a composition where x=0.2, light-emitting components in the wavelength range around the photosensitivity peak of a-Si increased, and consequently, the output from a-Si was improved by about 12% as compared with the case of CsI:In. The above results are summarized in Table 1.

As described above, when the composition of the parent material was configured to contain CsBr in addition to CsI, the emission wavelength of CsI:In was shifted to the long-wavelength side. Thus, a scintillator material that exhibited light emission in the wavelength range where detection sensitivity of a-Si was high could be prepared.

Example 2

This Example corresponds to the first embodiment. In this Example, a scintillator material represented by a general formula $CsI_{1-y}Cl_y$:In, which is a composition where x=0 in a general formula $CsI_{1-x-y}Br_xCl_y$:In, was prepared. First, cesium iodide (CsI) and cesium chloride (CsCl) were weighed so that, in the general formula $CsI_{1-y}Cl_y$, compositions satisfying y=1, 0.999, 0.99, 0.95, 0.90, 0.80, 0.65, 0.52, 0.20, 0.10, 0.050, 0.010, and 0 were obtained. Next, InI was added to each of the samples so that the indium (In) concentration was 0.01 mole percent relative to $CsI_{1-y}Cl_y$, and mixed. The resulting samples were melted at 650 degrees Celsius for five minutes to prepare 13 samples, the compositions of which continuously changed from one to another.

Emission spectra of the respective prepared samples were measured. The results of the emission peak wavelength are summarized in FIG. 1. When y=0, the end composition is represented by CsI:In, and this material exhibited an emission peak at 544 nm. When y=1, the end composition is represented by CsCl:In, and this material exhibited an emission peak at 493 nm. The emission peak in this composition range between these end compositions did not monotonically change between CsI:In and CsCl:In, but a composition range in which an emission peak was observed at the longer-wavelength side with respect to 544 nm, which was the emission peak of CsI:In, was present. In this composition range between the end compositions, originally, the emission peak of CsI:In and the emission peak of CsCl:In continuously shift. However, these peaks did not intersect in the intermediate composition range of 0<y<1 and were present as separate emission peaks. Therefore, in a composition range approximately represented by Mathematical formula 33, the emission peak was separated into two peaks.

$$0.9 \leq y < 1 \qquad [\text{Math.33}]$$

Here, the composition range in which an emission peak was observed at the longer-wavelength side with respect to at least 544 nm, which was the emission peak of CsI:In, was in the range of Mathematical formula 34.

$$0 < y \leq 0.8 \qquad [\text{Math.34}]$$

Furthermore, a composition range in which the emission peak wavelength was shifted to the longer-wavelength side with respect to the emission peak wavelength of CsI:In by 10 nm or more was in the range of Mathematical formula 35.

$$0.03 \leq y \leq 0.2 \qquad [\text{Math.35}]$$

Figure 3:
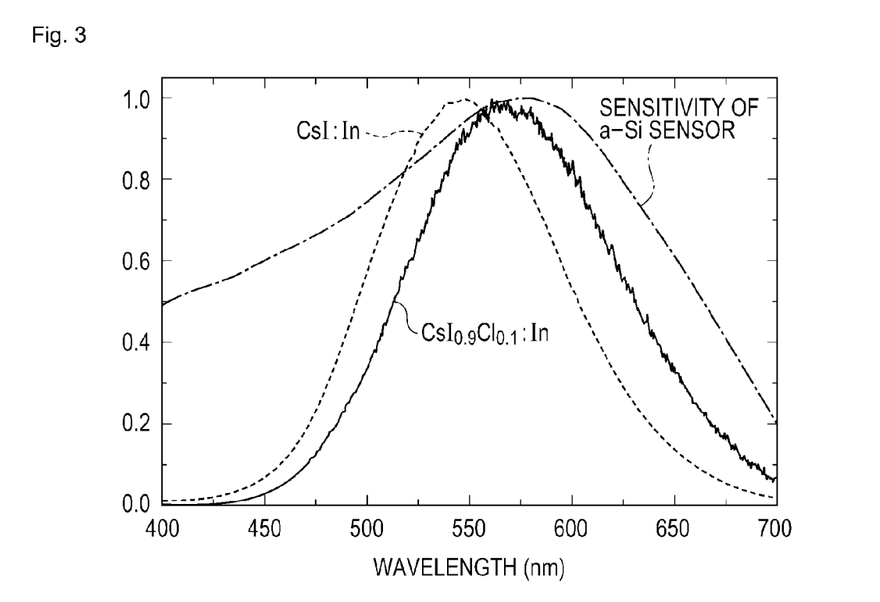
FIG. 3 is a graph showing the relationship between the emission spectrum of a scintillator material of Example 2 of the present invention and sensor detection sensitivity.

The composition in which the amount of shift of the emission peak became maximum was the case where y=0.1, and this composition is represented by $CsI_{0.9}Cl_{0.1}$:In. The emission spectrum of this composition in which y=0.1 is shown in FIG. 3. For comparison, the emission spectrum of CsI:In is also shown in FIG. 3. A sensitivity curve of a-Si is also shown in FIG. 3. An a-Si sensor also has sensitivity in a wavelength range of 450 nm or less, however, in actual devices, some of light components of about 450 nm or less are absorbed by polymer members. Therefore, even when a scintillator exhibits light emission at about 450 nm, the light neither reaches the a-Si sensor nor contributes to the output. The composition in which y=0.1 had an emission peak at 564 nm, which was shifted to the longer-wavelength side by about 20 nm with respect to the emission peak of CsI:In. In this manner, by using $CsI_{0.9}Cl_{0.1}$:In, which is a composition where y=0.1, light-emitting components in the wavelength range around the photosensitivity peak of a-Si increased, and consequently, the output from a-Si was improved by about 15% as compared with the case of CsI:In. The above results are summarized in Table 1.

As described above, when the composition of the parent material was configured to contain CsCl in addition to CsI, the emission wavelength of CsI:In was shifted to the long-wavelength side. Thus, a scintillator material that exhibited light emission in the wavelength range where detection sensitivity of a-Si was high could be prepared.

Example 3

This Example corresponds to the first embodiment. In this Example, a scintillator material represented by a general formula $CsI_{0.7}Br_{0.2}Cl_{0.1}$:In, which is a composition where x=0.2 and y=0.1 in the general formula $CsI_{1-x-y}Br_xCl_y$:In of the present invention, was prepared.

First, cesium iodide (CsI), cesium bromide (CsBr), and cesium chloride (CsCl) were weighed so that a composition of $CsI_{0.7}Br_{0.2}Cl_{0.1}$ was obtained. Next, InI was added thereto so that the indium (In) concentration was 0.01 mole percent relative to $CsI_{0.7}Br_{0.2}Cl_{0.1}$, and mixed. The resulting sample was melted at 650 degrees Celsius for five minutes to prepare a sample having a composition represented by $CsI_{0.7}Br_{0.2}Cl_{0.1}$:In.

Figure 4:
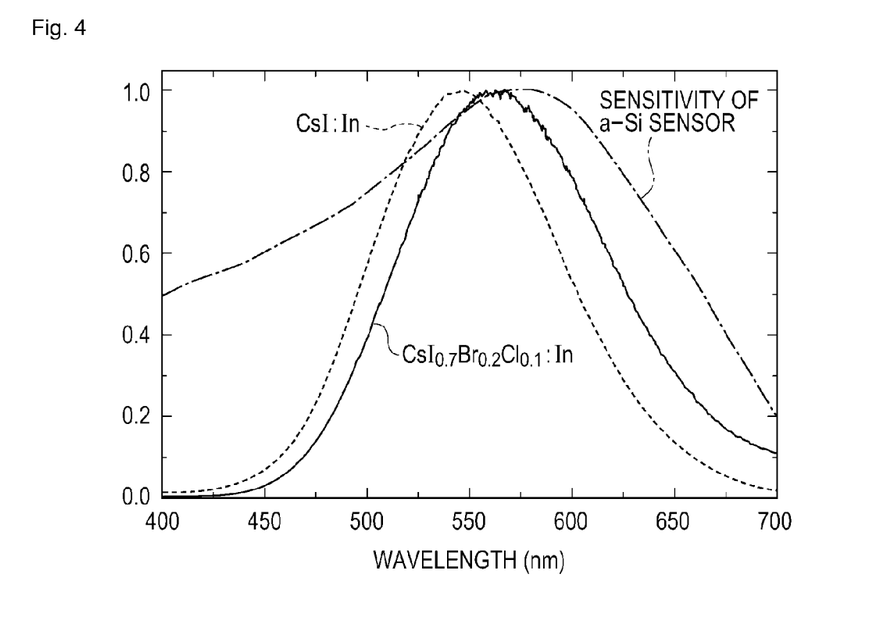
FIG. 4 is a graph showing the relationship between the emission spectrum of a scintillator material of Example 3 of the present invention and sensor detection sensitivity.

The emission spectrum of the prepared sample was measured. The result is shown in FIG. 4. For comparison, the emission spectrum of CsI:In is also shown in FIG. 4. A sensitivity curve of a-Si is also shown in FIG. 4. The emission peak of the sample was 560 nm, and was shifted to the longer-wavelength side by about 15 nm with respect to the emission peak of CsI:In. In this manner, by using $CsI_{0.7}Br_{0.2}Cl_{0.1}$:In, which is a composition where x=0.2 and y=0.1, light-emitting components in the wavelength range around the photosensitivity peak of a-Si increased, and consequently, the output from a-Si was improved by about 13% as compared with the case of CsI:In.

As described above, when the composition of the parent material was configured to contain CsBr and CsCl in addition to CsI, the emission wavelength of CsI:In was shifted to the long-wavelength side. Thus, a scintillator material that exhibited light emission in the wavelength range where detection sensitivity of a-Si was high could be prepared.

Example 4

This Example corresponds to the second embodiment. In this Example, a scintillator material represented by a general formula $CsI_{1-z}Rb_zI$:In, which is a composition where, in a general formula $[Cs_{1-z}Rb_z][I_{1-x-y}Br_xCl_y]$:In, x=y=0, i.e., Cs is replaced with Rb, thus replacing only the alkali element, was prepared. First, cesium iodide (CsI) and rubidium iodide (RbI) were weighed so that, in the general formula $CsI_{1-z}Rb_zI$:In, compositions satisfying z=1, 0.95, 0.90, 0.80, 0.70, 0.60, 0.50, 0.40, 0.30, 0.20, 0.10, 0.050, and 0 were obtained. Next, InI was added to each of the samples so that the indium (In) concentration was 0.01 mole percent relative to $CsI_{1-z}Rb_zI$, and mixed. The resulting samples were melted at 650 degrees Celsius for five minutes to prepare 13 samples, the compositions of which continuously changed from one to another.

Emission spectra of the respective prepared samples were measured. The results of the emission peak wavelength are summarized in FIG. 6. When z=0, the end composition is represented by CsI:In, and this material exhibited an emission peak at 544 nm. When z=1, the end composition is represented by RbI:In, and this material exhibited an emission peak at 567 nm. The emission peak in this composition range between these end compositions did not monotonically change between CsI:In and RbI:In, but a composition range in which an emission peak was observed at the longer-wavelength side with respect to 544 nm, which was the emission peak of CsI:In, was present. Furthermore, a composition range in which an emission peak was observed at the longer-wavelength side with respect to 567 nm, which was the emission peak of RbI:In, was present. Here, the composition range in which an emission peak was observed at the longer-wavelength side with respect to at least 544 nm, which was the emission peak of CsI:In, was in the range of 0<z<1. Furthermore, a composition range in which the emission peak wavelength was shifted to the longer-wavelength side with respect to the emission peak wavelength of CsI:In by 10 nm or more was in the range of Mathematical formula 36.

$$0.07 \leq z < 1 \quad \text{[Math.36]}$$

Here, the replacement of Cs (atomic number 55) with Rb (atomic number 37) decreases the stopping power for X-rays, and thus the amount of replacement with Rb is preferably a half or less of the amount of Cs. Accordingly, considering that the decrease in the stopping power for X-rays can be suppressed in a range of Mathematical formula 37, the composition range that achieves a wavelength shift of 10 nm or more is preferably determined in the range of Mathematical formula 38.

$$z \leq 0.5 \quad \text{[Math.37]}$$

$$0.07 \leq z \leq 0.5 \quad \text{[Math.38]}$$

Figure 7:
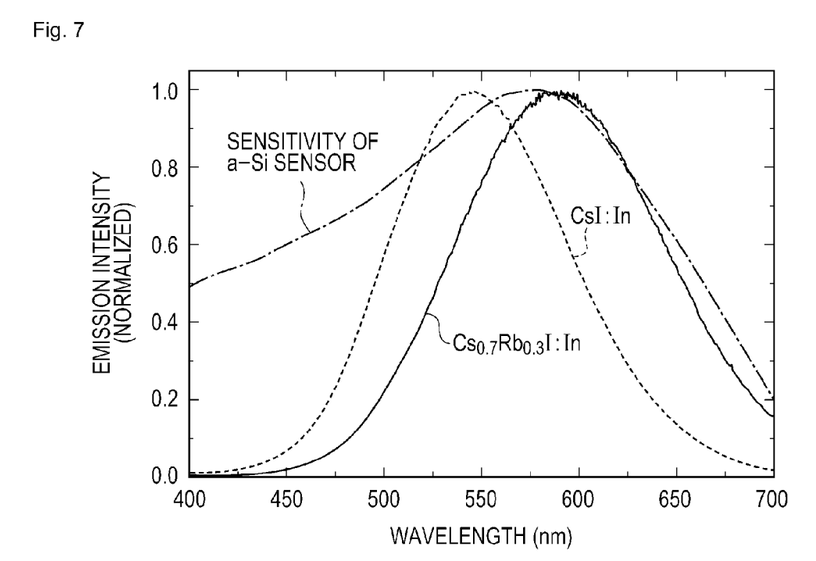
FIG. 7 is a graph showing the relationship between the emission spectrum of a scintillator material of Example 4 of the present invention and sensor detection sensitivity.

The composition in which the amount of shift of the emission peak became maximum was the case where z=0.3, and this composition is represented by $Cs_{0.7}Rb_{0.3}$:In. The emission spectrum of this composition in which z=0.3 is shown in FIG. 7. For comparison, the emission spectrum of CsI:In is also shown in FIG. 7. A sensitivity curve of a-Si is also shown in FIG. 7. The composition in which z=0.3 had an emission peak at 584 nm, which was shifted to the longer-wavelength side by about 40 nm with respect to the emission peak of CsI:In. In this manner, by using $Cs_{0.7}Rb_{0.3}$:In, which is a composition where z=0.3, light-emitting components in the wavelength range around the photosensitivity peak of a-Si increased, and consequently, the output from a-Si was improved by about 26% as compared with the case of CsI:In. The above results are summarized in Table 1.

As described above, when the composition of the parent material was configured to contain RbI in addition to CsI by replacing Cs with Rb, the emission wavelength of CsI:In was shifted to the long-wavelength side. Thus, a scintillator material that exhibited light emission in the wavelength range where detection sensitivity of a-Si was high could be prepared.

Example 5

This Example corresponds to the second embodiment. In this Example, a scintillator material was prepared in which Cs is replaced with Rb and I is replaced with Br in a general formula $[Cs_{1-z}Rb_z][I_{1-x-y}Br_xCl_y]$:In, thus replacing both an alkali element and a halogen element. Here, for simplicity, scintillator materials in which the amount of replacement of the alkali element is the same as the amount replacement of the halogen element, i.e., scintillator materials represented by $(CsI)_{1-a}(RbBr)_a$:In were prepared.

First, cesium iodide (CsI) and rubidium bromide (RbBr) were weighed so that, in the general formula $(CsI)_{1-a}(RbBr)_a$:In, compositions satisfying a=1, 0.95, 0.90, 0.80, 0.70, 0.60, 0.50, 0.40, 0.30, 0.20, 0.10, 0.050, and 0 were obtained. Next, InI was added to each of the samples so that the indium (In) concentration was 0.01 mole percent relative to $(CsI)_{1-a}(RbBr)_a$, and mixed. The resulting samples were melted at 650 degrees Celsius for five minutes to prepare 13 samples, the compositions of which continuously changed from one to another.

Emission spectra of the respective prepared samples were measured. The results of the emission peak wavelength are summarized in FIG. 6. When a=0, the end composition is represented by CsI:In, and this material exhibited an emission peak at 544 nm. When a=1, the end composition is represented by RbBr:In, and this material exhibited an emission peak at 465 nm. The emission peak in this composition range between these end compositions did not monotonically change between CsI:In and RbBr:In, but a composition range in which an emission peak was observed at the longer-wavelength side with respect to 544 nm, which was the emission peak of CsI:In, was present. In this composition range between the end compositions, originally, the emission peak of CsI:In and the emission peak of RbBr:In continuously shifted. However, these peaks did not intersect in the intermediate composition range of 0<a<1 and were present as separate emission peaks. Therefore, in a composition range approximately represented by Mathematical formula 39, the emission peak was separated into two peaks.

$$0.7 \leq a \leq 0.9 \qquad \text{[Math.39]}$$

Here, the composition range in which an emission peak was observed at the longer-wavelength side with respect to at least 544 nm, which was the emission peak of CsI:In, was in the range of Mathematical formula 40.

$$0 < a \leq 0.8 \qquad \text{[Math.40]}$$

Furthermore, a composition range in which the emission peak wavelength was shifted to the longer-wavelength side with respect to the emission peak wavelength of CsI:In by 10 nm or more was in the range of Mathematical formula 41.

$$0.05 \leq a \leq 0.6 \qquad \text{[Math.41]}$$

Figure 8:
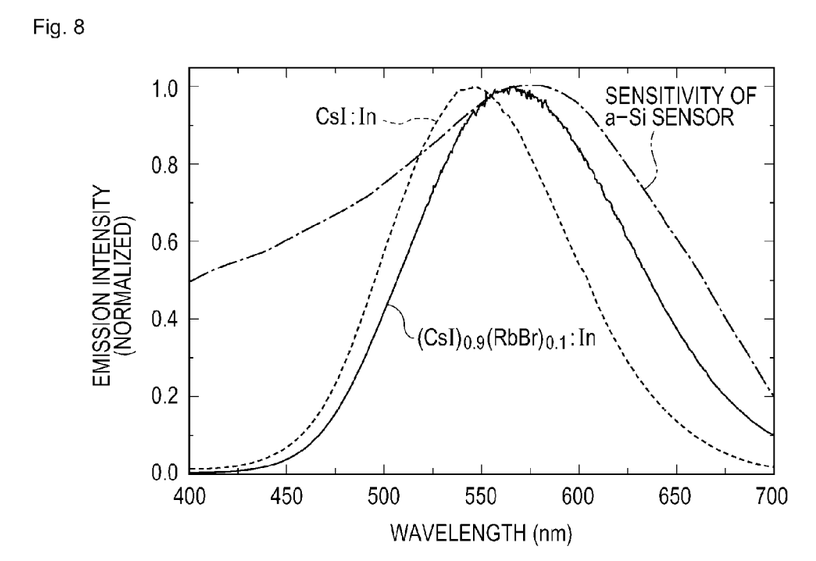
FIG. 8 is a graph showing the relationship between the emission spectrum of a scintillator material of Example 5 of the present invention and sensor detection sensitivity.

The composition in which the amount of shift of the emission peak became maximum was the case where a=0.1, and this composition is represented by $(CsI)_{0.9}(RbBr)_{0.1}$:In. The emission spectrum of this composition in which a=0.1 is shown in FIG. 8. For comparison, the emission spectrum of CsI:In is also shown in FIG. 8. A sensitivity curve of a-Si is also shown in FIG. 8. The composition in which a=0.1 had an emission peak at 559 nm, which was shifted to the longer-wavelength side by about 15 nm with respect to the emission peak of CsI:In. In this manner, by using $(CsI)_{0.9}(RbBr)_{0.1}$:In, which is a composition where a=0.1, light-emitting components in the wavelength range around the photosensitivity peak of a-Si increased, and consequently, the output from a-Si was improved by about 13% as compared with the case of CsI:In. The above results are summarized in Table 1.

As described above, when the composition of the parent material was configured to contain RbBr in addition to CsI by replacing Cs with Rb and replacing I with Br, the emission wavelength of CsI:In was shifted to the long-wavelength side. Thus, a scintillator material that exhibited light emission in the wavelength range where detection sensitivity of a-Si was high could be prepared.

Example 6

This Example corresponds to the second embodiment. In this Example, a scintillator material was prepared in which Cs is replaced with Rb and I is replaced with Cl in the general formula $[Cs_{1-z}Rb_z][I_{1-x-y}Br_xCl_y]$:In, thus replacing both an alkali element and a halogen element. Here, for simplicity, scintillator materials in which the amount of replacement of the alkali element is the same as the amount replacement of the halogen element, i.e., scintillator materials represented by $(CsI)_{1-b}(RbCl)_b$:In were prepared.

First, cesium iodide (CsI) and rubidium chloride (RbCl) were weighed so that, in the general formula $(CsI)_{1-b}(RbCl)_b$:In, compositions satisfying b=1, 0.95, 0.90, 0.80, 0.70, 0.60, 0.50, 0.40, 0.30, 0.20, 0.10, 0.050, and 0 were obtained. Next, InI was added to each of the samples so that the indium (In) concentration was 0.01 mole percent relative to $(CsI)_{1-b}(RbCl)_b$, and mixed. The resulting samples were melted at 650 degrees Celsius for five minutes to prepare 13 samples, the compositions of which continuously changed from one to another.

Emission spectra of the respective prepared samples were measured. The results of the emission peak wavelength are summarized in FIG. 6. When b=0, the end composition is represented by CsI:In, and this material exhibited an emission peak at 544 nm. When b=1, the end composition is represented by RbCl:In, and this material exhibited an emission peak at 450 nm. The emission peak in this composition range between these end compositions did not monotonically change between CsI:In and RbCl:In, but a composition range in which an emission peak was observed at the longer-wavelength side with respect to 544 nm, which was the emission peak of CsI:In, was present. In this composition range between the end compositions, originally, the emission peak of CsI:In and the emission peak of RbCl:In continuously shifted. However, these peaks did not intersect in the intermediate composition range of 0<b<1 and were present as separate emission peaks. Therefore, in a composition range approximately represented by Mathematical formula 42, the emission peak was separated into two peaks.

$$0.7 \leq b \leq 0.95 \qquad \text{[Math.42]}$$

Here, the composition range in which an emission peak was observed at the longer-wavelength side with respect to at least 544 nm, which was the emission peak of CsI:In, was in the range of 0<b<1. Furthermore, in a range of b<0.7, in which emission of light having a short wavelength caused by the separation of the emission peak was not observed, a composition range in which the emission peak wavelength was shifted to the longer-wavelength side with respect to the emission peak wavelength of CsI:In by 10 nm or more was in the range of Mathematical formula 43.

$$0.25 \leq b \leq 0.33 \qquad \text{[Math.43]}$$

Figure 9:
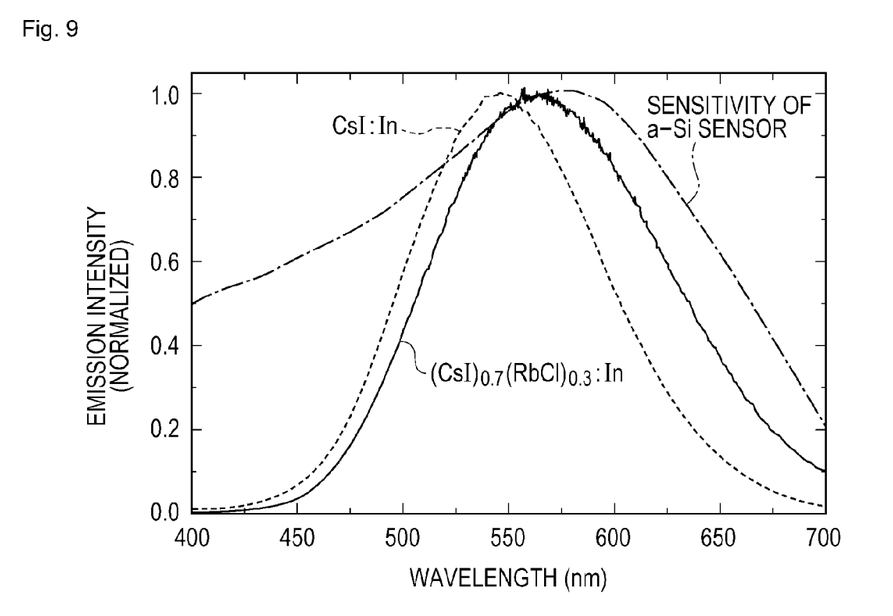
FIG. 9 is a graph showing the relationship between the emission spectrum of a scintillator material of Example 6 of the present invention and sensor detection sensitivity.

The composition in which the amount of shift of the emission peak became maximum was the case where b=0.3, and this composition is represented by $(CsI)_{0.7}(RbCl)_{0.3}$:In. The emission spectrum of this composition in which b=0.3 is shown in FIG. 9. For comparison, the emission spectrum of CsI:In is also shown in FIG. 9. A sensitivity curve of a-Si is also shown in FIG. 9. The composition in which b=0.3 had an emission peak at 556 nm, which was shifted to the longer-wavelength side by about 12 nm with respect to the emission peak of CsI:In. In this manner, by using $(CsI)_{0.7}(RbCl)_{0.3}$:In, which is a composition where b=0.3, light-emitting components in the wavelength range around the photosensitivity peak of a-Si increased, and consequently, the output from a-Si was improved by about 12% as compared with the case of CsI:In. The above results are summarized in Table 1.

As described above, when the composition of the parent material was configured to contain RbCl in addition to CsI by replacing Cs with Rb and replacing I with Cl, the emission wavelength of CsI:In was shifted to the long-wavelength side. Thus, a scintillator material that exhibited light emission in the wavelength range where detection sensitivity of a-Si was high could be prepared.

TABLE 1

| | Example 1 | Example 2 | Example 4 | Example 5 | Example 6 |
|---|---|---|---|---|---|
| Composition of parent material | $CsI_{1-x}Br_x$ | $CsI_{1-y}Cl_y$ | $Cs_{1-z}Rb_zI$ | $(CsI)_{1-a}(RbBr)_a$ | $(CsI)_{1-b}(RbCl)_b$ |
| Composition range in which long-wavelength shift is exhibited with respect to CsI: In | $0 < x \leq 0.7$ | $0 < y \leq 0.8$ | $0 < z < 1$ | $0 < a \leq 0.8$ | $0 < b < 1$ |
| Composition range in which long-wavelength shift is exhibited by 10 nm or more | $0.15 \leq x \leq 0.4$ | $0.03 \leq y \leq 0.2$ | $0.07 \leq z < 1$ | $0.05 \leq a \leq 0.6$ | $0.25 \leq b \leq 0.33$ |
| Composition in which the amount of wavelength shift becomes maximum | x = 0.2 $CsI_{0.8}Br_{0.2}$ | y = 0.1 $CsI_{0.9}Cl_{0.1}$ | z = 0.3 $Cs_{0.7}Rb_{0.3}I$ | a = 0.1 $(CsI)_{0.9}(RbBr)_{0.1}$ | b = 0.3 $(CsI)_{0.7}(RbCl)_{0.3}$ |
| Peak wavelength of composition in which the amount of wavelength shift becomes maximum | 557 nm | 564 nm | 584 nm | 559 nm | 556 nm |
| Relative output of composition in which the amount of wavelength shift becomes maximum with respect to CsI: In | 1.12 | 1.15 | 1.26 | 1.13 | 1.12 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-202935, filed Sep. 2, 2009 and No. 2010-037923, filed Feb. 23, 2010, which are hereby incorporated by reference herein in their entirety.

The invention claimed is:

1. A scintillator material comprising:
a compound represented by a general formula $[Cs_{1-z}Rb_z][I_{1-x-y}Br_xCl_y]$:In, wherein x, y, and z satisfy any one of conditions (1), (2), and (3) below:
(1) when $0<x+y<1$ and $z=0$, at least one of Mathematical formula 1 and Mathematical formula 2 is satisfied;

$$0<x\leq0.7 \quad [\text{Math. 1}]$$

$$0<y\leq0.8 \quad [\text{Math. 2}]$$

(2) when $0<x+y<1$ and $0<z<1$, at least one of Mathematical formula 3 and $0<y<1$ is satisfied; and $$0<x\leq0.8 \quad [\text{Math. 3}]$$

(3) when $x=y=0$, the relationship $0<z<1$ is satisfied, and the content of indium (In) is 0.00010 mole percent or more and 1.0 mole percent or less relative to $[Cs_{1-z}Rb_z][I_{1-x-y}Br_xCl_y]$.

2. The scintillator material according to claim 1, wherein x, y, and z satisfy any one of conditions (1), (2), and (3) below:
(1) when $0<x+y<1$ and $z=0$, at least one of Mathematical formula 4 and Mathematical formula 5 is satisfied;

$$0.15\leq x\leq0.4 \quad [\text{Math. 4}]$$

$$0.03\leq y\leq0.2 \quad [\text{Math. 5}]$$

(2) when $0<x+y<1$ and $0<z<1$, at least one of Mathematical formula 6 and Mathematical formula 7 is satisfied; and $$0.05<x\leq0.6 \quad [\text{Math. 6}]$$

$$0.25\leq y\leq0.33 \quad [\text{Math. 7}]$$

(3) when $x=y=0$, Mathematical formula 8 is satisfied $$0.07\leq z\leq0.5. \quad [\text{Math. 8}]$$

3. A scintillator material comprising:
a compound represented by a general formula $CsI_{1-x}Br_x$:In, wherein x satisfies Mathematical formula 9, and $$0<x\leq0.7 \quad [\text{Math. 9}]$$

the content of In is 0.00010 mole percent or more and 1.0 mole percent or less relative to $CsI_{1-x}Br_x$.

4. The scintillator material according to claim 3, wherein x satisfies Mathematical formula 10

$$0.15\leq x\leq0.4. \quad [\text{Math. 10}]$$

5. A scintillator material comprising:

a compound represented by a general formula $CsI_{1-y}Cl_y$:In, wherein y satisfies Mathematical formula 11, and $$0 < y \leq 0.8 \quad [\text{Math. 11}]$$

the content of In is 0.00010 mole percent or more and 1.0 mole percent or less relative to $CsI_{1-y}Cl_y$.

6. The scintillator material according to claim 5, wherein y satisfies Mathematical formula 12

$$0.03 \leq y \leq 0.2. \quad [\text{Math. 12}]$$

7. A scintillator material comprising:

a compound represented by a general formula $(CsI)_{1-a}(RbBr)_a$:In, wherein a satisfies Mathematical formula 13, and $$0 < a \leq 0.8 \quad [\text{Math. 13}]$$

the content of In is 0.00010 mole percent or more and 1.0 mole percent or less relative to $(CsI)_{1-a}(RbBr)_a$.

8. The scintillator material according to claim 7, wherein a satisfies Mathematical formula 14

$$0.05 \leq a \leq 0.6. \quad [\text{Math. 14}]$$

9. A scintillator material comprising:

a compound represented by a general formula $(CsI)_{1-b}(RbCl)_b$:In, wherein b satisfies $0 < b < 1$, and the content of In is 0.00010 mole percent or more and 1.0 mole percent or less relative to $(CsI)_{1-b}(RbCl)_b$.

10. The scintillator material according to claim 9, wherein b satisfies Mathematical formula 15

$$0.25 \leq b \leq 0.33. \quad [\text{Math. 15}]$$

11. A radiation detector comprising the scintillator material according to claim 1 and an amorphous silicon photodiode.

\* \* \* \* \*